(12) United States Patent
Lee et al.

(10) Patent No.: US 6,512,730 B1
(45) Date of Patent: Jan. 28, 2003

(54) DISK RECEIVING AND TRANSFERRING DEVICE FOR A DISK DRIVE

(75) Inventors: In Ho Lee, Euiwang (KR); Sang Hoon Shin, Pyungtack (KR); Hyuk Soo Park, Sungnam (KR); In Gi Cheon, Seoul (KR); Han Baek Lee, Pyungtack (KR)

(73) Assignee: LG Electronics Inc., Seoul (KR)

( * ) Notice: Subject to any disclaimer, the term of this patent is extended or adjusted under 35 U.S.C. 154(b) by 112 days.

(21) Appl. No.: 09/617,202

(22) Filed: Jul. 14, 2000

(30) Foreign Application Priority Data

| Jul. 14, 1999 | (KR) | 99-28526 |
| Jul. 14, 1999 | (KR) | 99-28529 |
| Jul. 14, 1999 | (KR) | 99-28530 |
| Jul. 14, 1999 | (KR) | 99-28534 |
| Jul. 14, 1999 | (KR) | 99-28536 |
| Jul. 14, 1999 | (KR) | 99-28538 |
| Jul. 14, 1999 | (KR) | 99-28540 |

(51) Int. Cl.$^7$ ............................................. G11B 17/04
(52) U.S. Cl. ................................................... 369/77.1
(58) Field of Search ........................... 369/75.1, 75.2, 369/77.1; 360/99.06, 99.07

(56) References Cited

U.S. PATENT DOCUMENTS

| 5,022,023 A | * | 6/1991 | Toyoguchi | 369/75.2 |
| 5,113,388 A | * | 5/1992 | Yamada et al. | 369/270 |
| 5,166,917 A | * | 11/1992 | Decoster et al. | 369/270 |
| 5,173,894 A | * | 12/1992 | Kido | 360/99.06 |
| 5,255,255 A | * | 10/1993 | Kaneda et al. | 360/99.07 |
| 6,157,607 A | * | 12/2000 | Nakamichi et al. | 369/191 |
| 6,167,015 A | * | 12/2000 | Jeong | 369/77.1 |
| 6,256,280 B1 | * | 7/2001 | Sakurai et al. | 369/77.1 |

* cited by examiner

*Primary Examiner*—David L. Ometz
(74) *Attorney, Agent, or Firm*—Birch, Stewart Kolasch & Birch, LLP

(57) ABSTRACT

A disk receiving and transferring device by which a disk is precisely guided into the disk drive. Disks of different diameter can be inserted into a single disk drive, and at the same time gears are smoothly engaged during power transmission for the clamping of a disk. The disk receiving and transferring device of the invention includes: a disk transferor for transferring a disk by the power of a driving source; a balance guide unit for guiding the disk inserted into the device by the transferor for thereby precisely inserting the disk; a holder guide unit which interlocks with the balance guide unit and is guided by the balance guide unit for thereby receiving the disk moved by the transferor and guiding the disk until the disk transfer is finished; and a sensor guide unit for interlocking with the holder guide unit, guiding the disk by the insertion power of the disk, and connecting the power for clamping the disk, wherein the balance guide unit and holder guide unit are configured to be fastened when the power of the driving source is connected.

3 Claims, 20 Drawing Sheets

DISK RECEIVING AND TRANSFERRING DEVICE FOR A DISK DRIVE

BACKGROUND OF THE INVENTION

1. Field of the Invention

The present invention relates to a disk receiving and transferring device for a disk drive, and more particularly, to a disk receiving and transferring device by which the movement of a disk is precisely guided to the disk drive, disks of different diameter can be used in a single disk drive; and at the same time gears are smoothly engaged during power transmission for the clamping of a disk.

2. Description of the Background Art

FIG. 1 is a plane view illustrating the construction of a disk transferring device for a roller-type disk drive in the conventional art, and FIG. 2 is a side sectional view illustrating the construction of a disk transferring device for a rollertype disk drive in the conventional art.

As illustrated therein, the disk drive is externally constructed of a frame 1, said frame 1 having elements for driving a disk D. A front plate 2 is installed at the front of the frame 1, and a slot 2a which the disk D is inserted into or extracted from is formed at the front plate 2. A loading motor (not shown) for loading or unloading the disk D is installed at one inner side of the frame 1, and a roller 3 rotated by a driving force of the loading motor (not shown) is horizontally installed inside the frame 1.

Here, the roller 3 is made of a material being elastic and exhibiting a predetermined extent of friction force, such as rubber. The roller 3 is supported by a roller bracket 4, and one end of the roller bracket 4 is connected to a spring 4c. Thus, the roller 3 pivots on a hinge 4a in a clockwise direction, and accordingly it is likely to be firmly in contact with a lower recording surface of the disk D by the roller bracket 4.

A timing plate 5 operated by the disk D when the disk D is inserted a certain amount is installed on a connecting plate 6, and a driving plate 7 is installed on the frame 1 at a lower side of the timing plate 5. A rack gear portion 7a is formed at one side of the driving plate 7, and the rack gear portion 7a, engaged with a loading gear G installed on the frame 1, drives the driving plate 7. A guide sloping portion 7b is formed at a front end portion of the driving plate 7, that is, at the driving plate 7 on a lower side of the roller bracket 4, and an interlocking extrusion portion 7c for interlocking with the timing plate 5 is formed at a rear end portion thereof. An interlocking pin 4b provided at the roller bracket 4 is in contact with the guide sloping portion 7b. A guide flap 8 curved in a vertical upward direction for thereby forming a lifting guide slot 8a is provided at a rear end portion of the driving plate 7.

A spindle motor 9 for rotating the disk D is installed at the center of the inside of the frame 1, and a turn table 10 on which the disk D is mounted is installed at the rotating shaft of the spindle motor 9.

In addition, a clamp plate 11 is installed inside the frame 1 so that its free end portion can be lifted at a predetermined angle from a hinge pin 11a, and a lifting guide boss 11b is formed at one side of the clamp plate 11 to be guided along the lifting guide slot 8a of the guide flap 8 driven together with the driving plate 7, thus achieving the lifting of the clamp plate 11. At the free end portion of the clamp plate 11, a clamp 12 for holding the disk D mounted on the turntable 10 is installed.

In the drawings, reference letter S denotes a sensor for sensing the insertion and extraction of the disk D, which is installed at a front end portion of the frame 1.

The operation of the disk transferring device in accordance with the present invention thusly constructed will now be described.

In order to load the disk D, when a user inserts the disk D via the slot 2a of the front plate 2, the sensor S senses the insertion of the disk D to thereby drive the loading motor (not shown). When the loading motor (not shown) is driven, the roller 3 is rotated. The roller 3 is firmly in contact with the lower recording surface of the disk D by elastic force of the spring 4c acting upon the disk D of the roller 3 for thereby moving the disk D into the disk drive. When the disk D is inserted so that it is located in an upward direction of the turntable 10, the timing plate 5 is moved in an arrow direction A of FIG. 1.

When the timing plate 5 is moved a certain amount, the rack gear portion 7a of the driving plate 7 engages with the loading gear G for thereby moving the driving plate 7 by the driving force of the loading motor (not shown). With the movement of the driving plate 7, the interlocking pin 4b of the roller bracket 4 in contact with the sloping portion 7b of the driving plate 7 is guided along the sloping portion 7b, and the roller bracket 4 pivots on the hinge pin 4a in a counterclockwise direction, whereby the roller bracket 4 is separated from the lower surface of the disk D and the disk D is mounted on the turn table 10.

With the movement of the driving plate 7, the guide boss 11b of the clamp plate 11 located at the lifting guide slot 8a of the guide flap 8 is guided along the lifting guide slot 8a, and the clamp plate 11 is lowered by pivoting on the hinge pin 11a in the clockwise direction. As the clamp plate 11 is lowered, a clamp 12 provided on the clamp plate 11 clamps the disk D mounted on the turn table 1, and the operation of reproducing or recording a signal of the disk D may begin.

Meanwhile, the unloading operation of the disk D is achieved in a reverse manner to the above loading operation.

However, the above-described conventional art has the following problems. One problem is that, when the disk D is moved by the roller 3, the disk D is not precisely moved to the desired position because the roller 3 cannot precisely guide the disk D. This is because, although many constructions for guiding the disk D during the movement of the disk D have been disclosed, those constructions cannot guide the disk D to its home position (a position at which the center of the disk D corresponds to the center of the turn table 7t) while not acting as a load on the movement of the disk D.

That is, if the construction for guiding the disk D during the movement of the disk D acts as a load, the roller 3 is largely loaded. Thus, there arise problems that the roller 3 is abraded, its life span is shortened, and the signal recording surface of the disk D is stained with debris generated due to the abrasion of the roller causing errors when reading or reproducing a recorded signal from the disk D. In addition, there is another problem that, if the roller 3 is abraded, the transfer of the disk D is not precisely achieved.

In the above-described conventional construction, the overall size of the device is so large that it goes against the tendency of lightening, thinning, shortening, and miniaturizing the disk driver. Thus, there is still another problem that a disk of a certain size, for example, only one of a 12 cm disk and an 8 cm disk has to be used.

Regarding the loading gear G and the rack gear portion 7a of the driving plate 7, as illustrated in FIG. 1, each gear tooth is angularly formed such that the gearing therebetween is not smooth, as the angled gear teeth cause undesirable collisions. If these collisions continuously occur, the gear teeth are abraded and thus they are not appropriately engaged. To avoid this collision, there have been disclosed a construction in which the gear teeth are always engaged. However, in this construction, there is a problem because power is supplied to the structure for clamping even when clamping is not achieved, thus resulting in unnecessary power consumption.

SUMMARY OF THE INVENTION

The present invention provides a disk receiving and transferring device for a disk drive which is capable of precisely guiding a disk during the movement of the disk. The disk receiving and transferring device for a disk drive is lightened, thinned, shortened, and miniaturized. The disk receiving and transferring device for a disk drive which makes it possible to use disks of different diameter in a single disk drive. The disk receiving and transferring device for a disk drive allows the engagement between gears to be smoothly achieved during power transmission for the clamping of a disk.

The disk receiving and transferring device for the disk drive in the present invention includes: a disk transferring means for transferring a disk by the power of a driving source; a balance guide unit for guiding the disk inserted into the device by the transferring means for thereby precisely inserting the disk; a holder guide unit which interlocks with the balance guide unit and is guided by the balance guide unit for thereby receiving the disk moved by the transferring means and guiding the disk until the disk transfer is finished; and a sensor guide unit for interlocking with the holder guide unit, guiding the disk by the insertion power of the disk, and connecting the power for clamping the disk.

The balance guide unit and holder guide unit are configured to be fastened as soon as the power of the driving source is connected.

Additional advantages, objects and features of the invention will become more apparent from the description which follows.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

A preferred embodiment of the present invention is now described with reference to the attached drawings.

Figure 1:
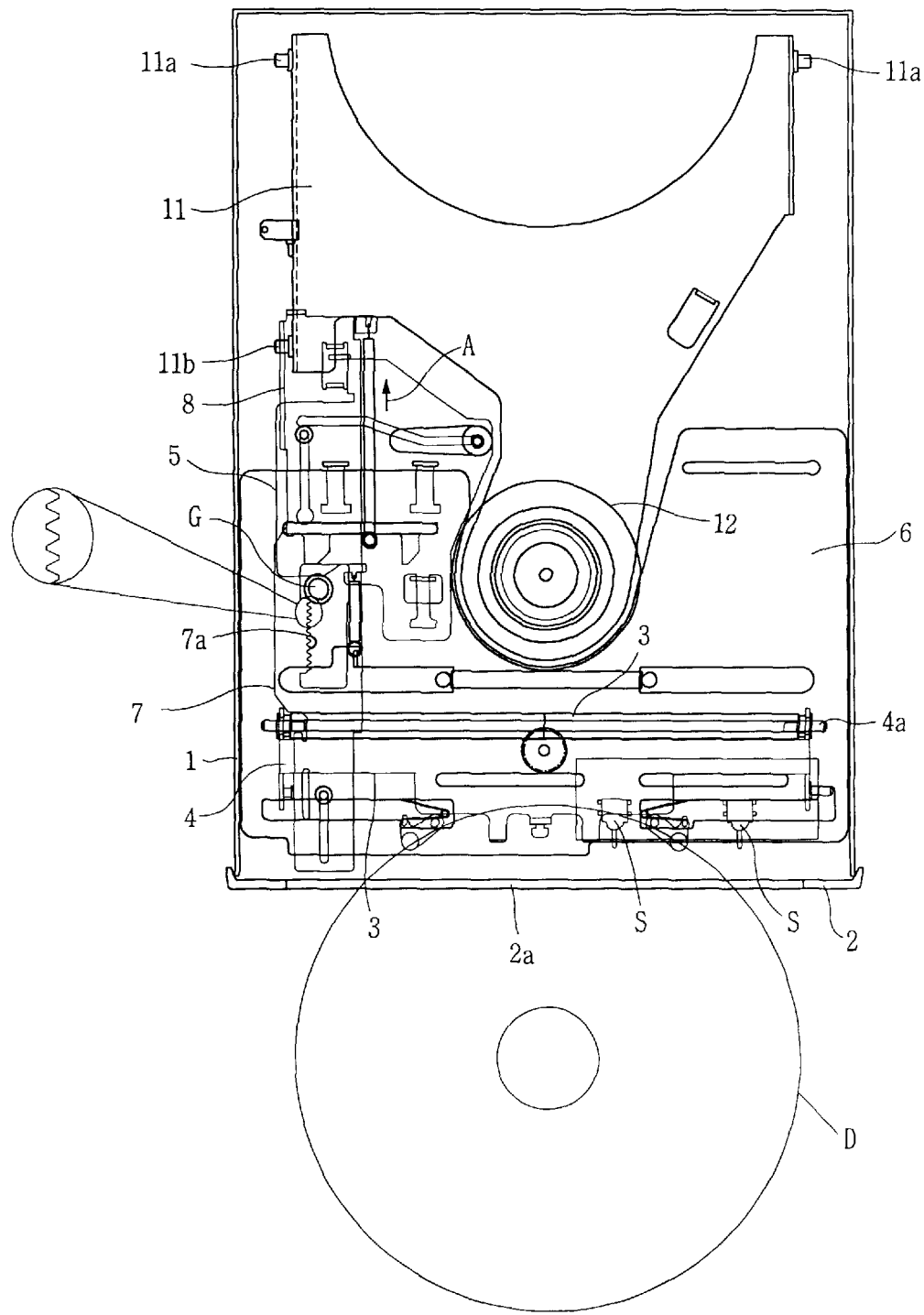
FIG. 1 is a plane view illustrating the construction of a disk transferring device for a disk drive in accordance with the conventional art.
Figure 2:
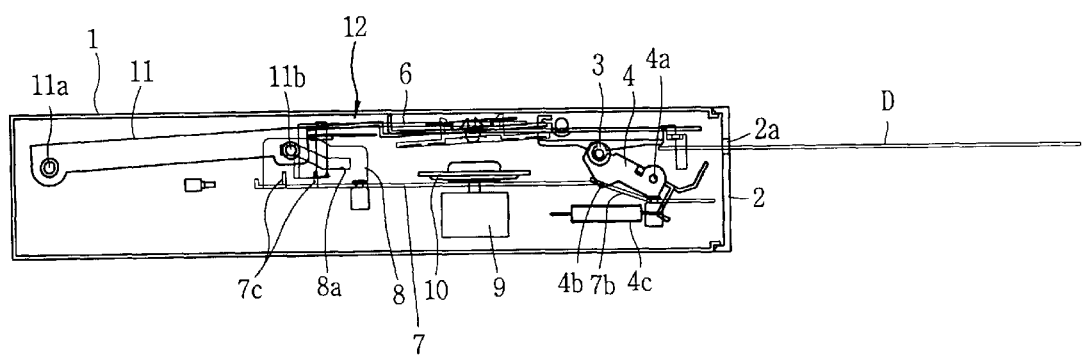
FIG. 2 is a side sectional view illustrating the construction of a disk transferring device for a disk drive in accordance with the conventional art.
Figure 3:
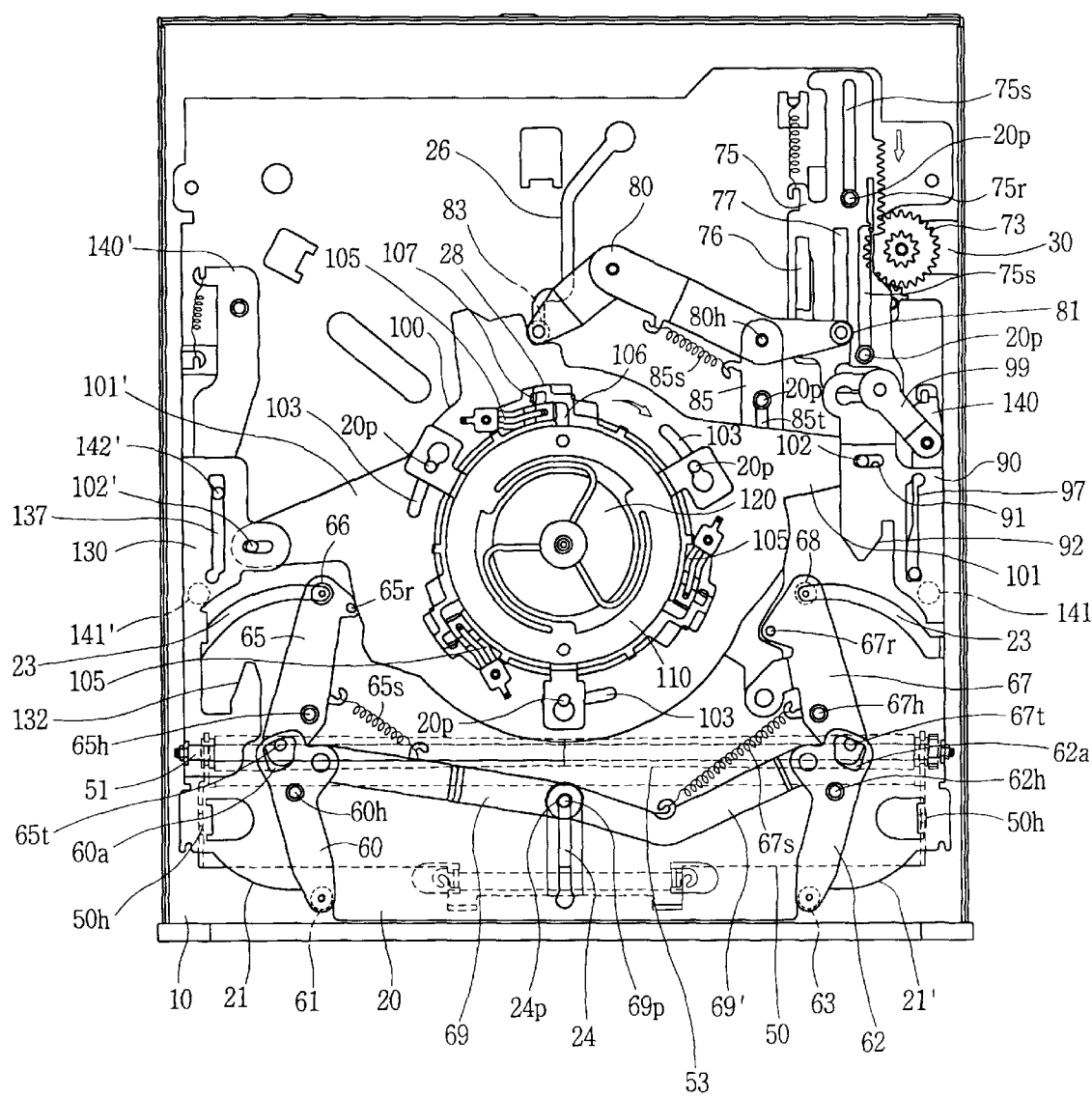
FIG. 3 is a plane view illustrating the construction of a disk drive in accordance with the present invention.
Figure 4:
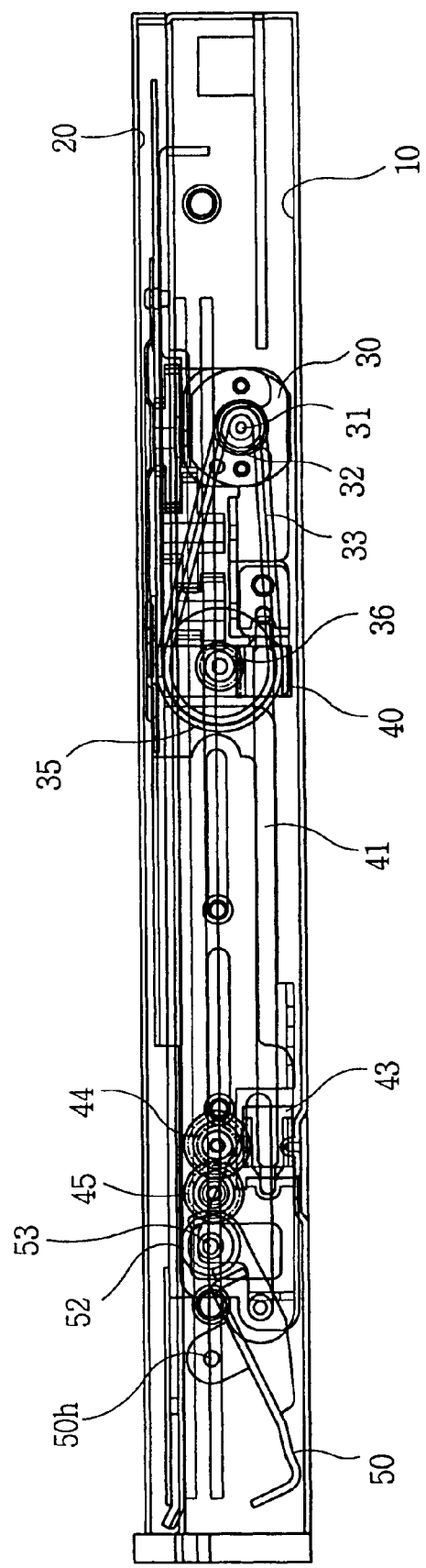
FIG. 4 is a side sectional view illustrating the construction of a disk drive in accordance with the present invention.

As illustrated in FIGS. 3 and 4, each element is installed between a main chassis 10 and an upper chassis 20.

Firstly, a pickup unit (not shown) required for the recording and reproducing onto a disk D is installed at the main chassis 10. The construction of the pickup unit is not the focus of the essentials of the present invention, so the detail description thereof is omitted.

In addition, a turntable (not shown) on which the disk D is rotated is installed at the main chassis 10. In general, the turntable is rotated by a spindle motor (not shown).

The parts for the movement and clamping of the disk D are installed at the upper chassis 20 as illustrated in FIG. 3. In detail, a driving motor 30 for providing power for the transfer and clamping of the disk D is installed at one side of the upper chassis 20.

Figure 6A:
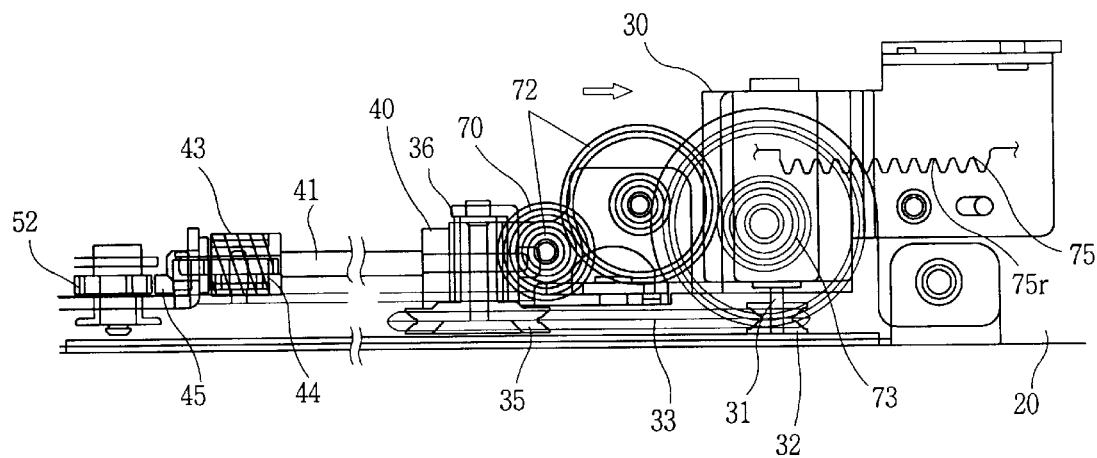
FIG. 6a is a plane view illustrating the path through which power is transmitted in a disk drive in accordance with the present invention.
Figure 6B:
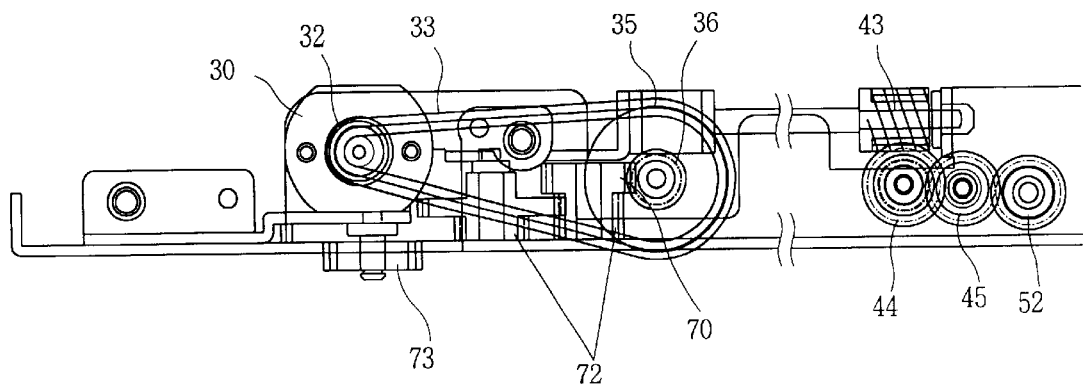
FIG. 6b is a side sectional view illustrating the path through which power is transmitted in a disk drive in accordance with the present invention.

As illustrated in FIGS. 6a and 6b, the driving power of the driving motor 30 is transmitted to a slave pulley 35 via a belt 33 wrapped around a driving pulley 32 installed at the rotating shaft 31 of the driving motor 30. With the slave pulley 35, a driving worm 36 is coaxially installed. The driving worm 36 simultaneously transmits power to a disk transfer path and a disk clamping path. That is, a loading worm wheel 40 at the upper side of the driving worm 36 and a clamping worm wheel 70 at one side thereof are engaged with each other.

The loading worm wheel 40 engages with the driving worm 36, being connected to a connecting shaft 41. At the end portion of the opposite side of the connecting shaft 41, a slave worm wheel 43 is installed. The slave worm wheel 43 is engaged with a first loading gear 44, said first loading gear 44 being engaged with a second loading gear 45. The second loading gear 45 is engaged with a roller gear 52.

As illustrated in FIG. 4, the roller gear 52 is installed to be coaxial with a roller shaft 51 to be described below for thereby rotating the roller shaft 51. Meanwhile, a roller bracket 50 is installed at a lower surface of the front end portion of the upper chassis 100, as illustrated in FIGS. 3 and 4. The roller bracket 50 is installed to pivot on a hinge point 50h at both ends thereof, and is elastically supported by a spring so that a roller 53 to be described below is biased toward the bottom side of the upper chassis 20.

At the roller bracket 50, a roller shaft 51 is installed in a horizontal direction, to which a roller 53 is connected. The roller 53, which is generally made of rubber, is in contact with a lower surface of the disk D and transfers the disk D by its friction force.

Figure 5:
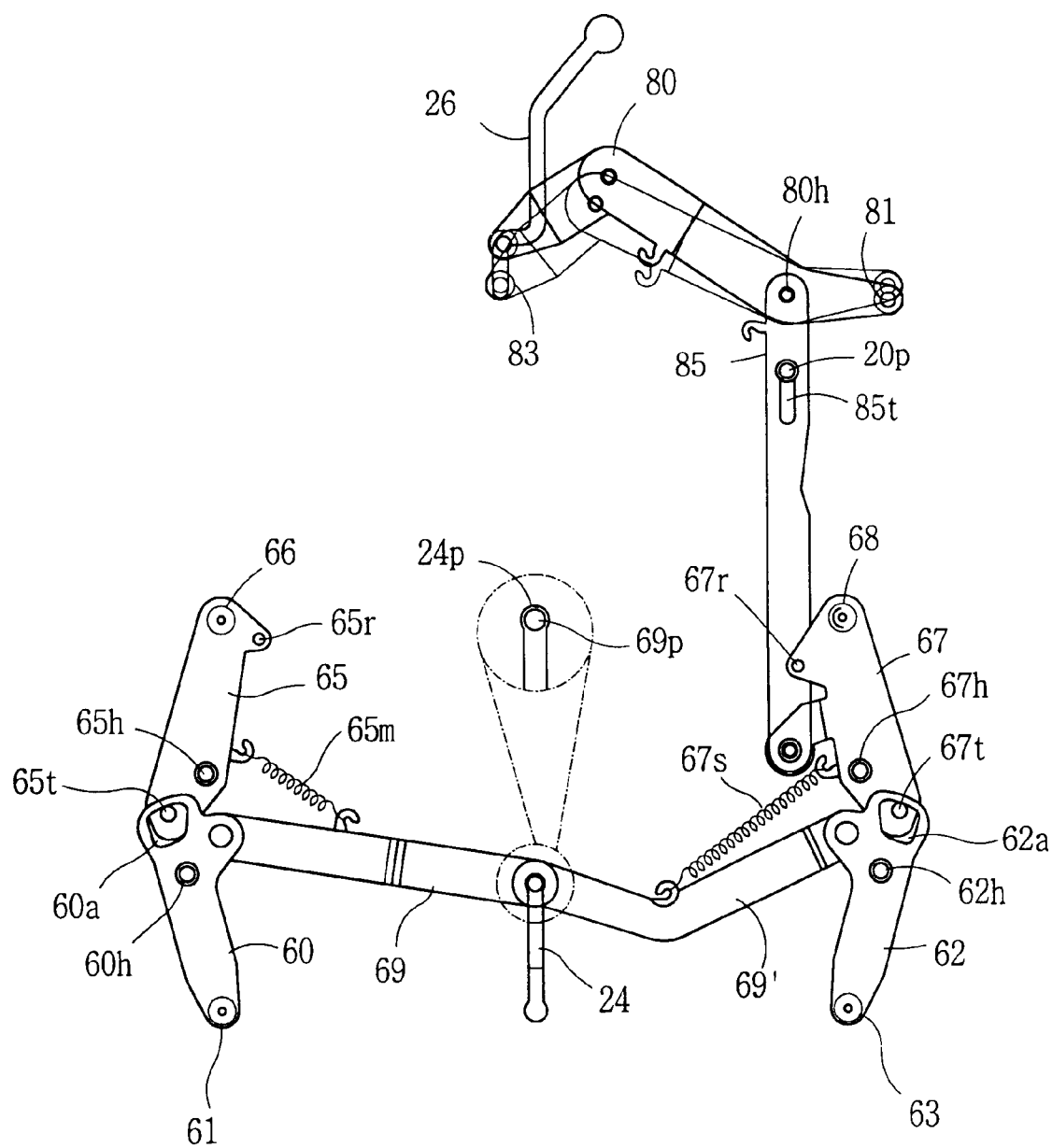
FIG. 5 is a plane view illustrating the construction of a lever for guiding a disk in a disk drive in accordance with the present invention.

Hereinafter, the construction for guiding the transfer of the disk D will now be described. As illustrated in FIGS. 3 through 5, first and second balance rods 61 and 63 and first and second holder rods 66 and 68 for guiding the sides of the disk D during the insertion of the disk D are operatively connected with the upper chassis 20.

The first and second balance rods 61 and 63 are respectively formed on the first and second balance levers 60 and 62 in a downward direction extending away from the upper chassis 20. The first and second balance rods 61 and 63 are guided along guide surfaces 21 and 21' formed at the front end of the upper chassis 20 as illustrated in FIG. 3. The first and second balance levers 60 and 62 are installed at the top surface of the upper chassis 20 so that they pivot around hinges 60h and 62h respectively connected thereto. And, interlocking holes 60a and 62a exist respectively at the first and second balance levers 60 and 62. The interlocking holes 60a and 62a are used to control the operation of the first and second holder levers 65 and 67 to be described below.

The first and second holder rods 66 and 68 are connected to the first and second holder levers 65 and 67 installed to be pivotable around hinges 65h and 67h connected to the top surface of the upper chassis 20. Namely, the first and second holder rods 66 and 68 are connected to the front end of the first and second holder levers 65 and 67, and thereby protrusively installed at the lower portion of the upper chassis 20 via guide slots 23a and 23a' formed at both sides of the upper chassis 20 as illustrated in FIG. 3.

At the above-described first and second holder levers 65 and 67, interlocking bosses 65t and 67t located at the interlocking holes 60a and 62a are installed, and interference avoiding slots 65r and 67r which drives the first and second holder levers 65 and 67 so that the first and second holder rods 66 and 68 deviate from the sides of the disk D at the end of the loading operation of the disk D are provided. Here, the interlocking holes 60a and 62a allow the first and second holder levers 65 and 67 to be operatively connected to the first and second balance levers 60 and 62 so that they are fastened to each other without floating.

Meanwhile, first and second connecting levers 69 and 69' are connected with the first and second balance levers 60 and 62, and the first and second connecting levers 69 and 69' are connected with each other by a connecting pin 69p. The connecting pin 69p is guided along a slot 24 formed at the upper chassis 20. Here, as illustrated in FIG. 5, a partial insertion preventing unit 24p is formed at one end portion of the slot 24 (the position at which the connecting pin 69p is located with the disk D not being inserted).

If the disk D is not precisely inserted into the center of the drive, the balance of power applied to the balance rods 61 and 63 of the balance levers 60 and 62 by the disk D is not maintained. In this case, the partial insertion preventing unit 24p is used to prevent the operation of the balance levers 60 and 62 by fastening the connecting pin 69p.

Meanwhile, the first and second connecting levers 69 and 69' are also connected to the first and second holder levers 65 and 67 by restoring springs 65s and 67s, respectively.

Resultantly, the first and second balance levers 60 and 62, first and second holder levers 65 and 67, and first and second connecting levers 69 and 69' are connectingly interlocked with each other. The restoring springs 65s and 67s are used to restore the levers to their original positions when the disk D is removed.

Figure 7:
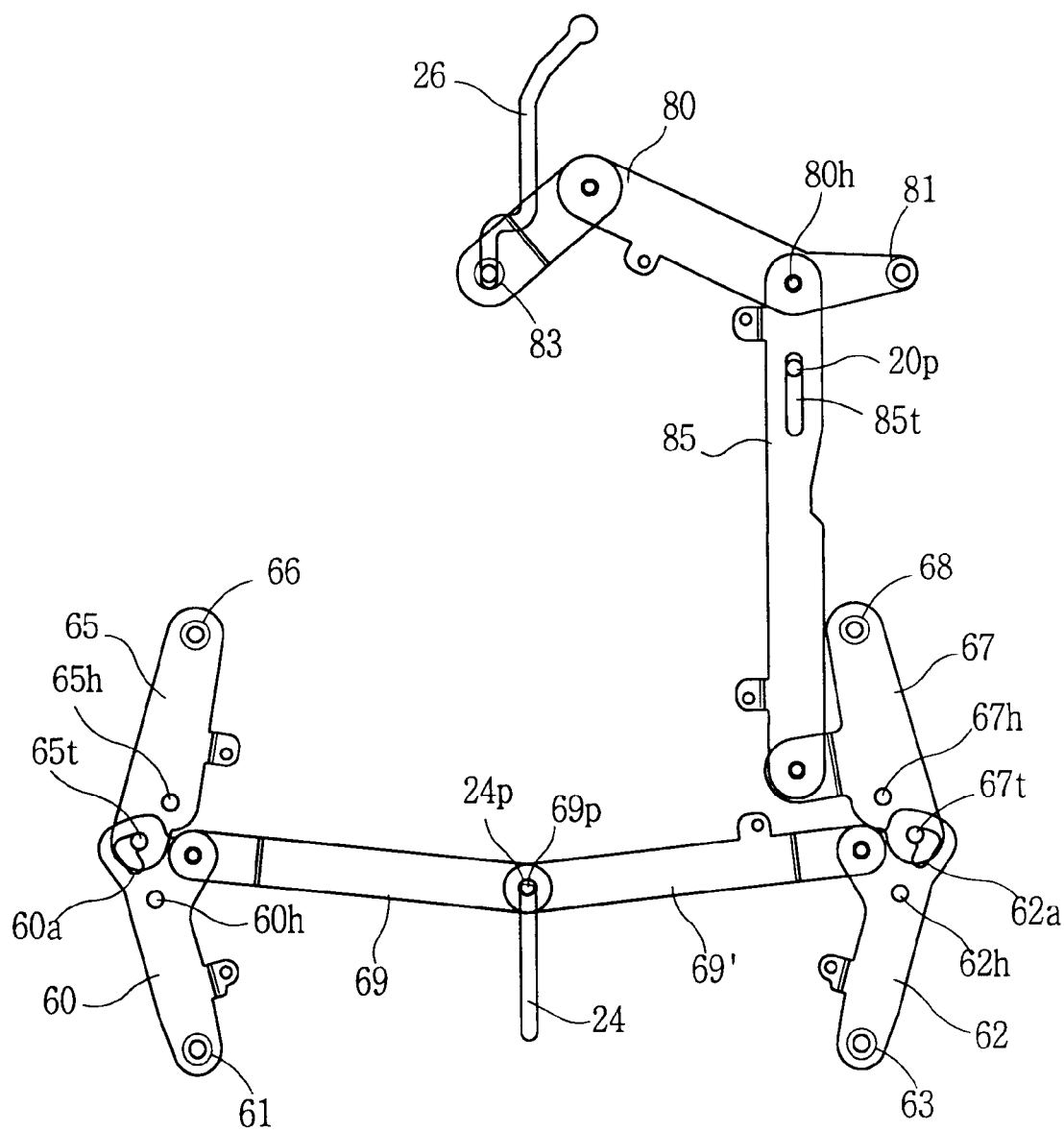
FIG. 7 is a plane view illustrating another example of a lever connecting structure which comprises a disk drive in accordance with the present invention.
Figure 8:
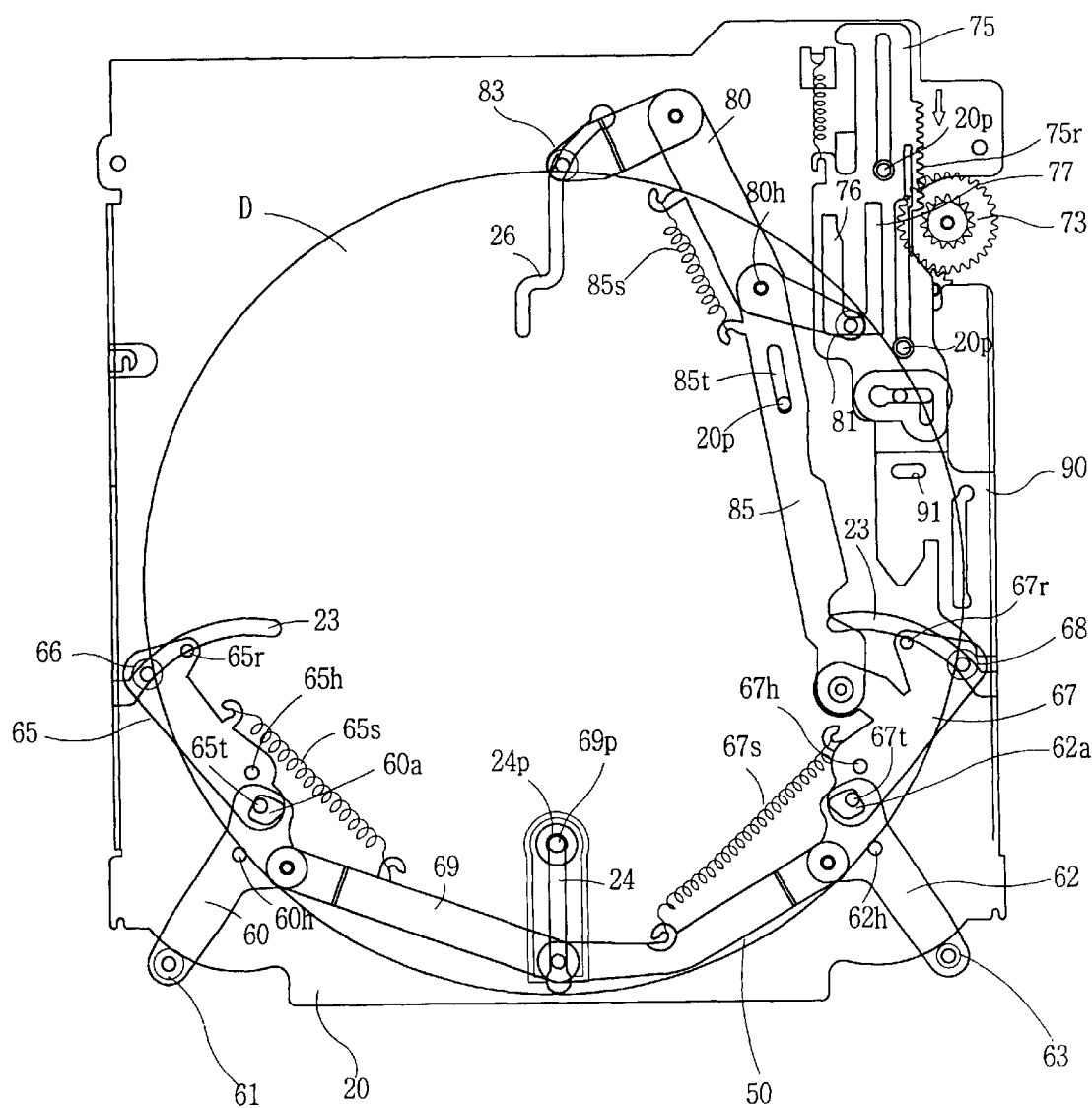
FIG. 8 is a plane view illustrating yet another example of a lever connecting structure which comprises a disk drive in accordance with the present invention.

Another example of the balance levers 60 and 62 and holder levers 65 and 67 at which the above-described interlocking holes 60a and 62a are formed is illustrated in FIG. 7. The interlocking holes 60a and 62a of FIG. 7 is formed in a boomerang shape. FIG. 8 illustrates yet another example of the interlocking holes 60a and 62a, which are constructed to be far more rectangular than those of FIG. 6. The construction for transmitting power for clamping the disk D on the turntable will now be described with reference to FIGS. 3, 6a and 6b.

As illustrated in FIG. 6a, the clamping worm wheel 70 is provided with a gear row 72 for transmitting power, being engaged with the same. A driving gear 73 located at the end portion of the gear row 72 is installed to be selectively engaged with a rack gear portion 75r of a driving plate 75 installed on the upper chassis 20.

As illustrated in FIG. 3, the driving plate 75 includes two moving slots 75s, and is configured to move forwardly and backwardly along the moving slots 75s by guide pins 20p installed at the upper chassis 20 and inserted into the moving slots 75s.

First and second guide slots 76 and 77 for guiding a sensor lever 80 to be described below are formed at the driving plate 75 according to the type of the disk D. The first guide slot 76 guides the sensor lever 80 in case of 12 cm disk D, and the second guide slot 77 guides the sensor lever 80 in case of 8 cm disk D.

In detail, the sensor lever 80 is installed at the top surface of the upper chassis 20 to be pivotable on a hinge 80h at one end portion of a connecting lever 85 to be described below. As illustrated in FIG. 5, the sensor lever 80 is used to transmit power for clamping the disk D by moving the driving plate 75 to thus engage the rack gear portion 75r of the driving plate 75 with the driving gear 73, as a sensor rod 83 installed at one end of the sensor lever 80 to be described below is pushed by the disk D inserted into the disk drive by the roller 53.

When the driving plate 75 is driven by the sensor lever 80 for thereby engaging the rack gear portion 75r with the driving gear 73, one of the gear teeth of the rack gear portion 75r that is initially engaged with the driving gear 73 has a rounded shape.

As illustrated in FIG. 5, since a guide boss 81 is connected to one end portion of the sensor lever 80, the sensor lever 80 can be selectively located at the first and second guide slots 76 and 77 of the driving-plate 75 illustrated in FIG. 3 according to the type of the disk D. A sensor rod 83 pushed by the movement of the disk D, is connected at the other end portion of the sensor lever 80 in connection with the sides of the front end of the disk D inserted into the drive.

The sensor rod 83 is located and travels within a sensor rod slot 26 E formed at the upper chassis 20 and extends in a downward direction from the upper chassis 20.

Meanwhile, the sensor lever 80 is connected with the second holder lever 67 by the connecting lever 85 as illustrated in FIG. 5. That is, the connecting lever 85 and the sensor lever 80 are connected with each other by the hinge 80h, and at the same time they are connected by the restoring spring 85s. And, since a moving slot 85t receiving the guide pin 20p fixed on the upper chassis 20 is formed at the connecting lever 85, the connecting lever 85 becomes movable along the top surface of the upper chassis 20 as far as the length of the moving slot 85t.

Figure 9:
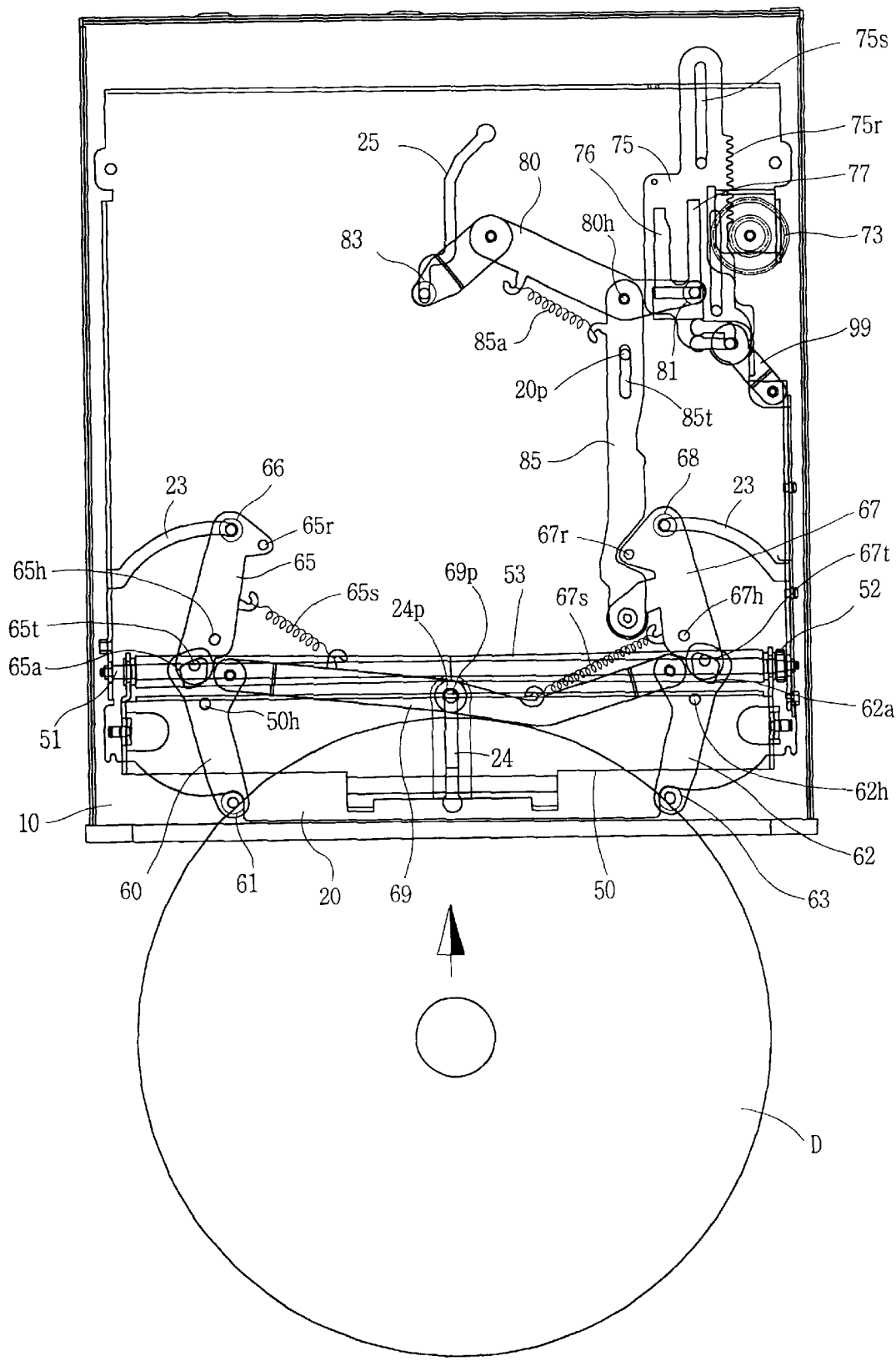
FIGS. 9 through 14 are operational views sequentially illustrating the transfer of a 12 cm disk in a disk drive in accordance with the present invention.
Figure 10:
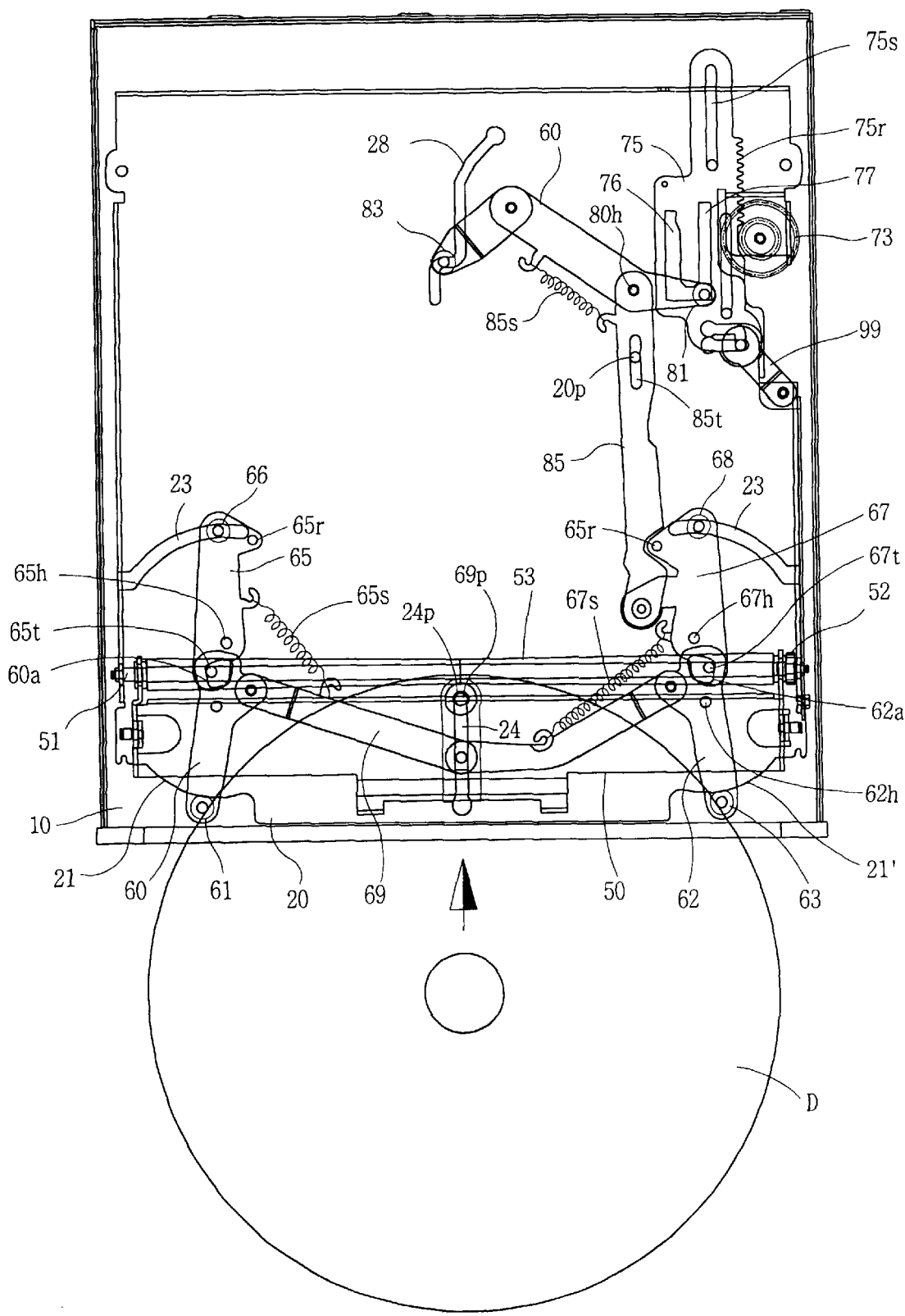

In the above-described device of the invention, the movement of the components for receiving a 12 cm disk will be described with reference to FIGS. 9 through 14. As illustrated in FIG. 9, the user inserts the disk D into the disk drive, the disk D simultaneously touches the first and second balance rods 61 and 63. In the case that the disk D is not inserted into the front center of the disk drive, but is partially inserted in an off-center manner into the disk drive, since the connecting pin 69p is caught in the partial insertion prevention unit 24p of the vertical slot 24, the first and second balance rods 61 and 63 are not moved. When the disk D is properly inserted, the first and second balance rods 61 and 63 are moved along the guide surfaces 21 and 21', as illustrated in FIG. 10.

As the disk D is continuously inserted, the disk D contacts the roller 53 and, as the disk D is sensed by a sensor (not shown), the driving motor 30 is operated. By the operation of the driving motor 30, its driving power is transmitted to the loading worm wheel 40 illustrated in FIG. 6a. Then, as the roller gear 52 is rotated by the loading worm wheel 40, the roller shaft 51 illustrated in FIG. 3 is rotated and thereby the roller 53 begins to move the disk D. As the disk D is moved by the roller 53, the first and second balance rods 61 and 63 are further pushed apart, each being in contact with the sides of the disk D.

Figure 11:
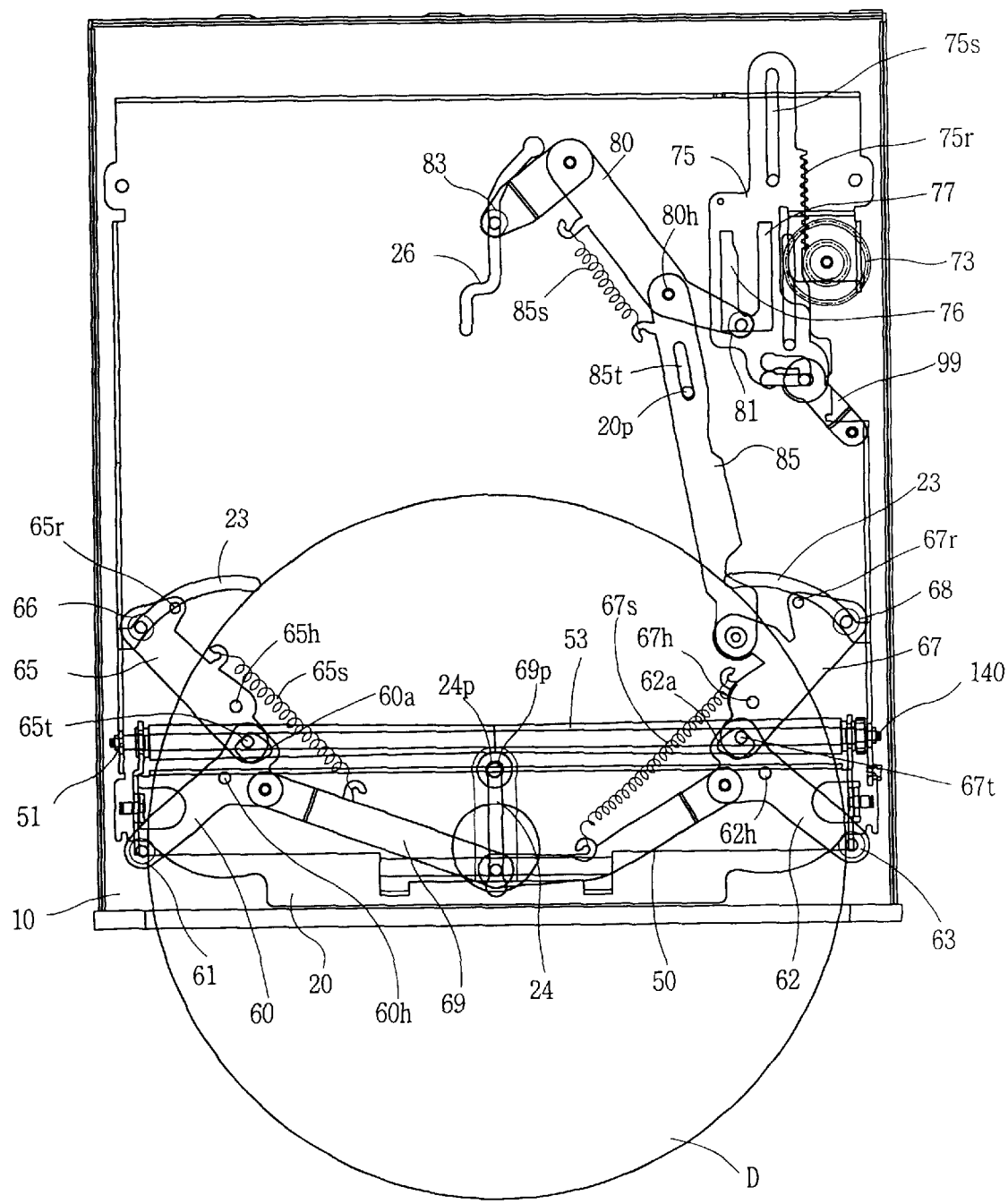
Figure 12:
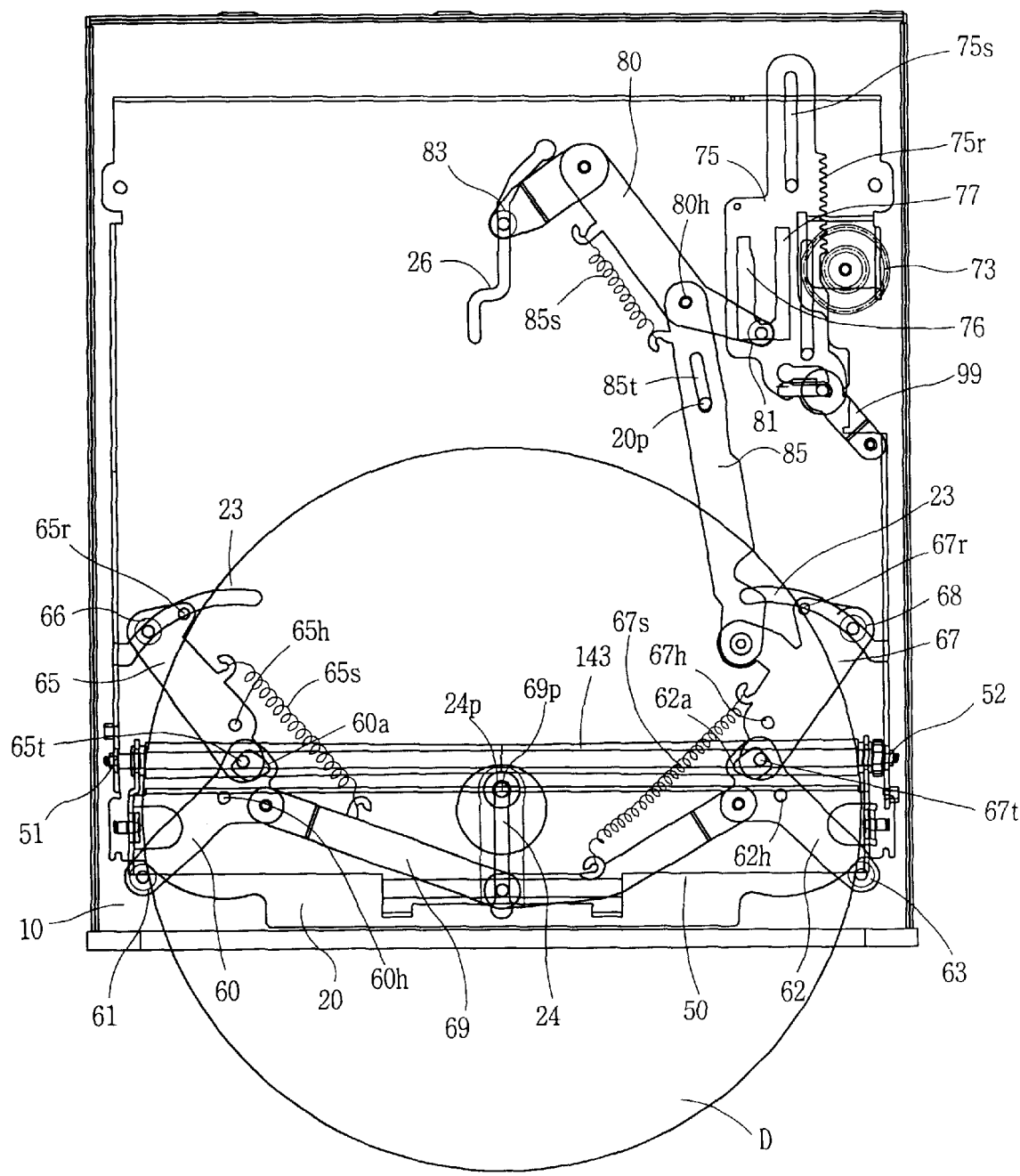
Figure 13:
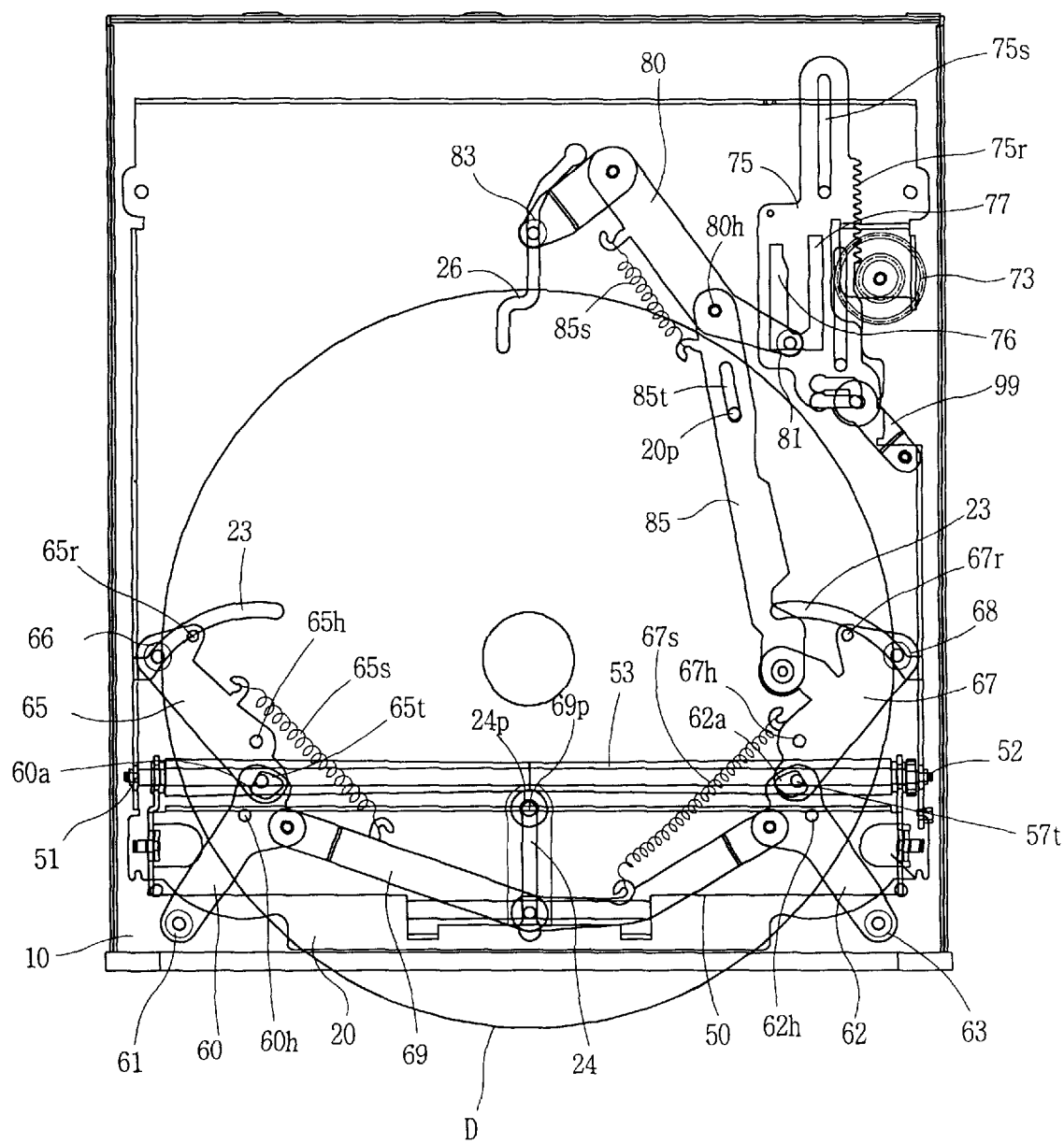

When half of the disk D is inserted into the disk drive, the first and second balance rods 61 and 63 are at their maximum expanded positions as shown in FIG. 12. As the disk D is continuously inserted, the first and second holder rods 66 and 68 then move to their maximum expanded positions in the guide slots 23 as illustrated in FIG. 11. The first and second holder levers 66 and 68 move due to the first and second balance levers 60 and 62 as illustrated in FIG. 12, for thereby accurately guiding the disk D into the disk drive as illustrated in FIG. 13. Here, the sensor rod 83 of the sensor lever 80 connected to the second holder lever 67 by the connecting lever 85 is also moved along the sensor rod slot 26, and the guide boss 81 is located at the first guide slot 76 when receiving a 12 cm disk D.

Figure 14:
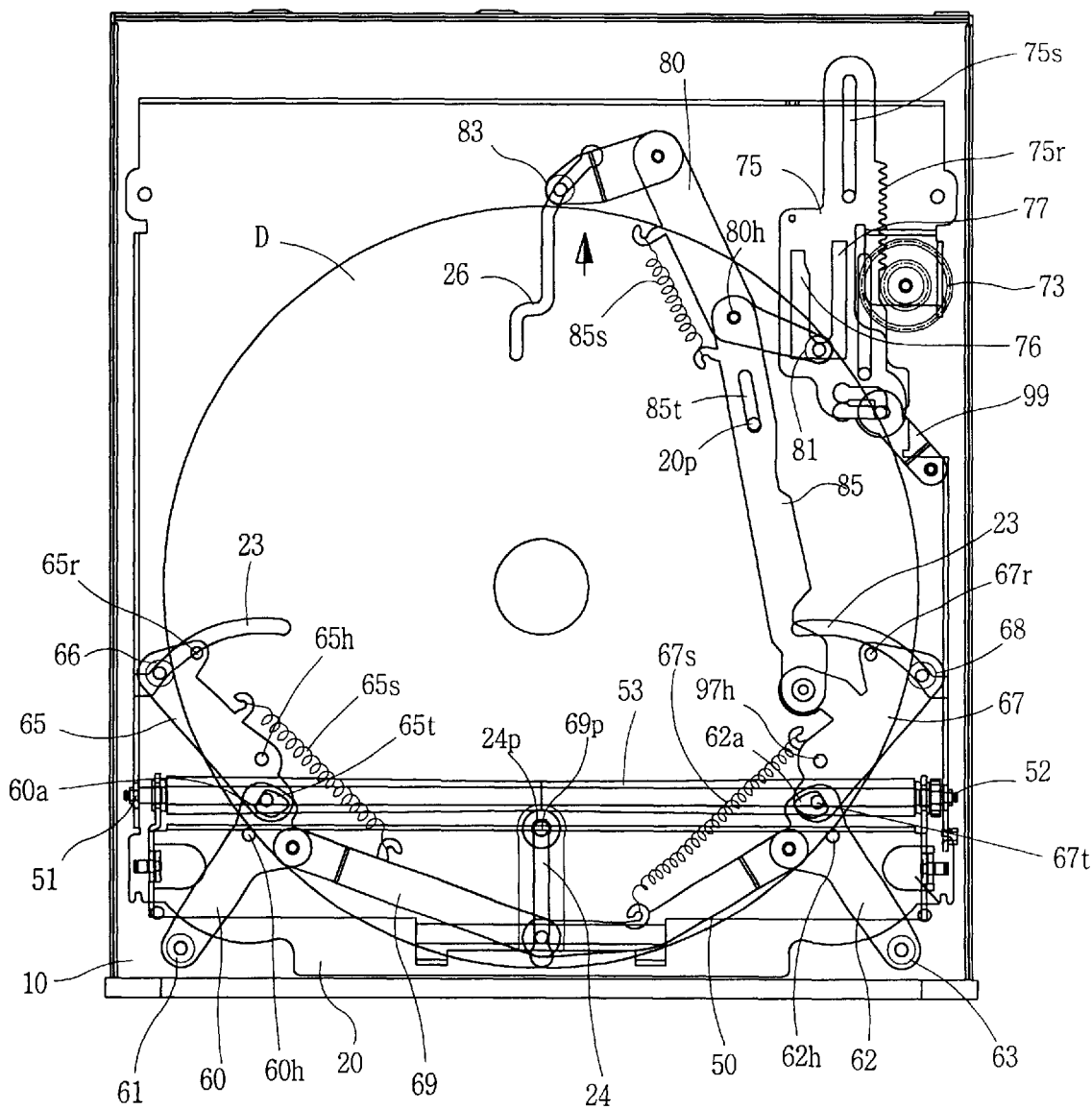
Figure 15:
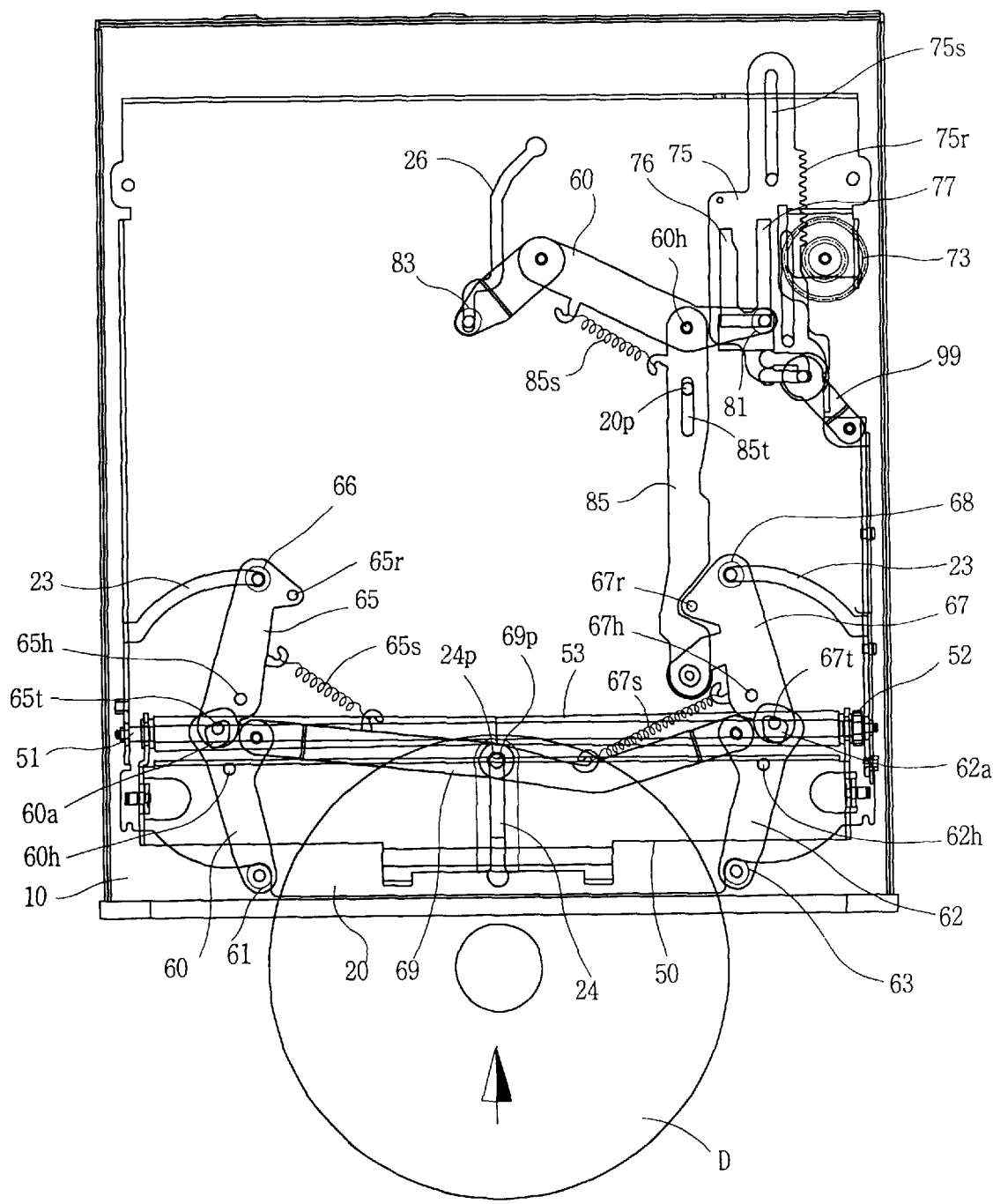
FIGS. 15 through 18 are operational views sequentially illustrating the transfer of an 8 cm disk in a disk drive in accordance with the present invention.

If the disk D is continuously inserted into the disk drive, the front end of disk D pushes the sensor rod 83 of the sensor lever 80. With the sensor lever 80 being pushed, the guide boss 81 of the sensor lever 80 moves the driving plate 75 in a direction towards the front plate 2 as illustrated in FIG. 14. In this way, when the driving plate 75 is moved, the rack gear 75r of the driving plate 75 and the driving gear 73 are engaged with each other, and thereby the power of the driving motor is transmitted to the driving plate 75.

As described above, in the case that the sensor lever 80 moves the driving plate 75, the roller 53 for transferring the disk D hardly receives any load because the balance levers 60 and 62 and the holder levers 65 and 67 are not moved.

To achieve this in the present invention, interlocking holes 60a and 62a are formed on the balance levers 60 and 62, and interlocking bosses 65t and 67t are formed at on the holder levers 65 and 67.

The movement of driving plate 75 causes the elements for clamping the disk to operate. In detail, the driving plate 75 is moved in a direction towards the front plate 2, and a first lifting plate 90 shown in FIG. 8 is moved in the same direction as the driving plate 75. The first lifting plate 90 moved by the driving plate 75 is installed to cover parts of the top surface and sides of the upper chassis 20. The first lifting plate 90 is operated in connection with the driving plate 75, being installed at one side of the upper chassis 20.

As described above, when the first lifting plate 90 is moved, the clamping driving plate 100 is rotated via an interlocking pin 102 located at a driving hole 91 formed on the first lifting plate 90, for thereby clamping the disk D as shown in FIG. 3.

Figure 16:
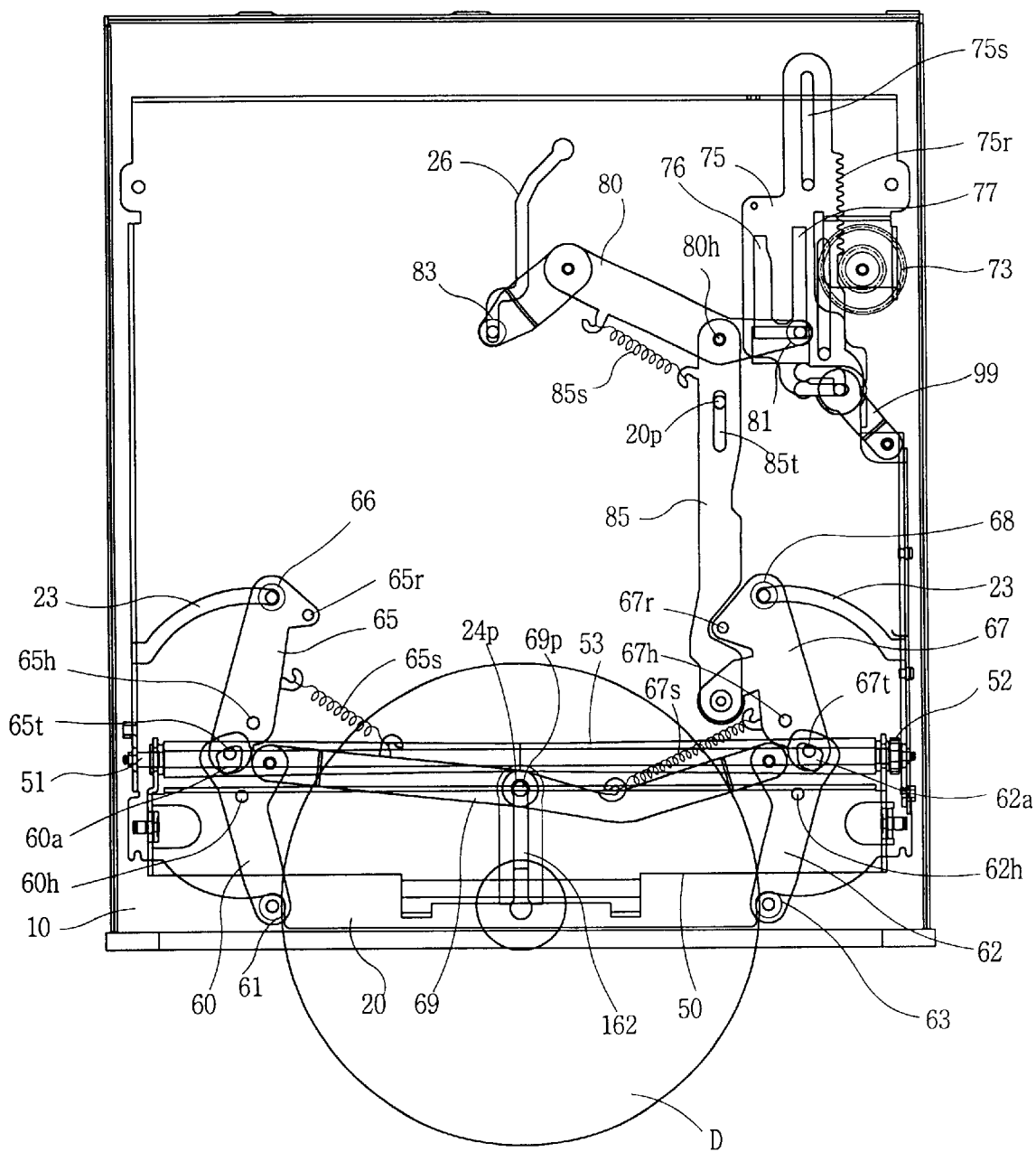
Figure 17:
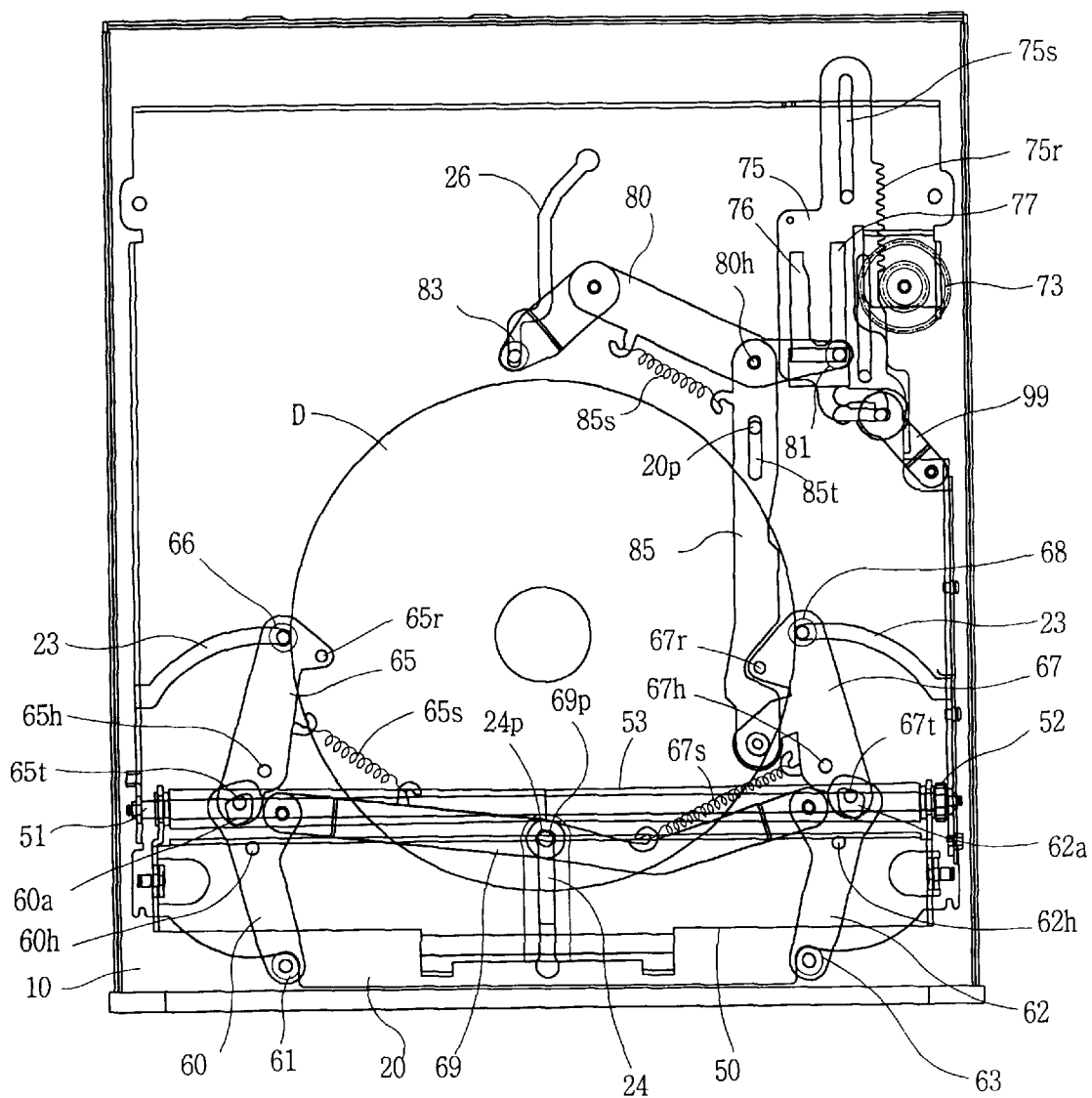
Figure 18:
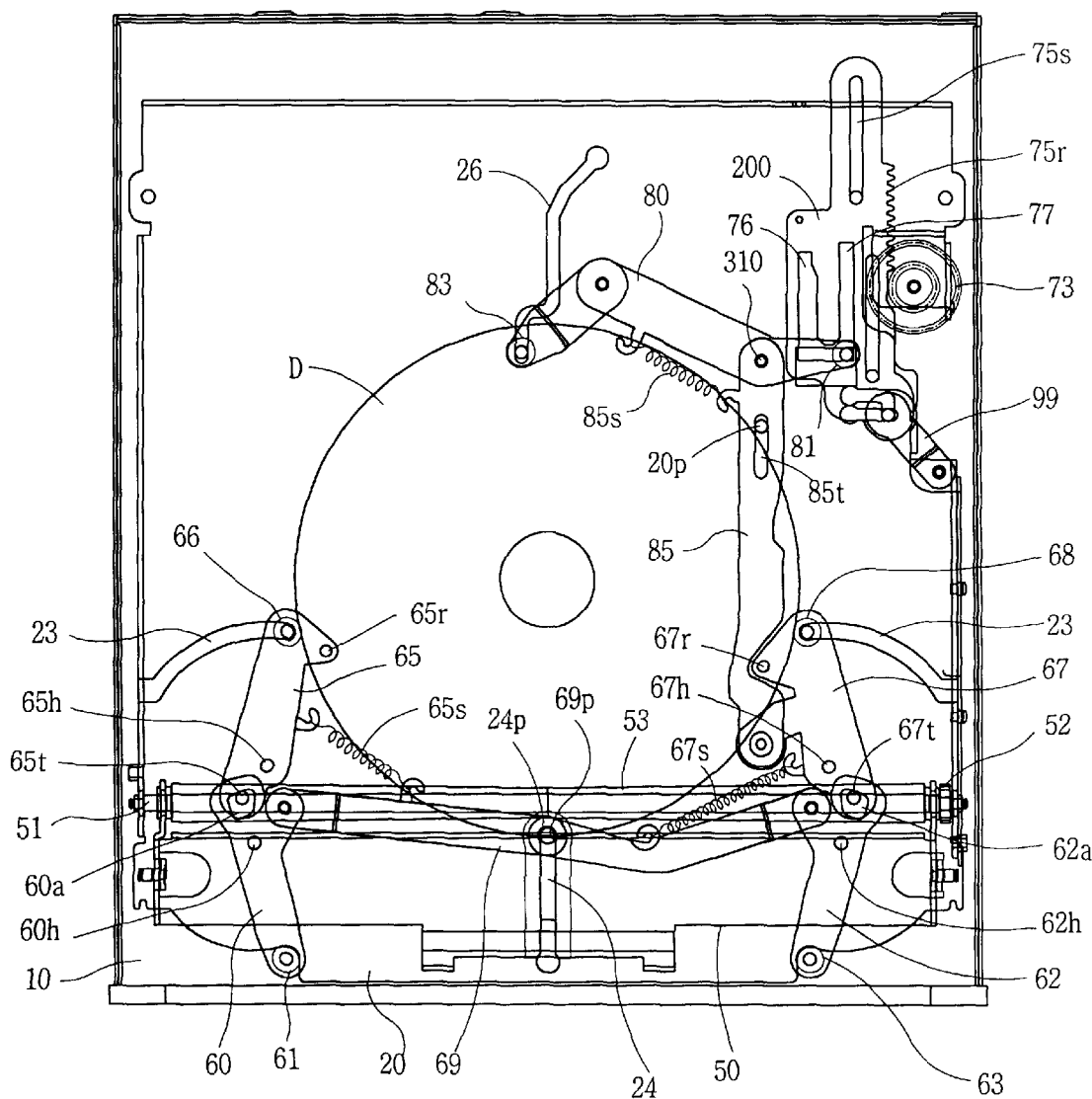

Meanwhile, the case of inserting a disk D having a diameter less than 12 cm, for example an 8 cm disk, is illustrated in FIGS. 15 through 18. In this case, both sides of the disk D are guided by the first and second balance rods 61 and 63 as illustrated in FIG. 16, only if more than half of the disk D is inserted into the drive, because the size of the disk D is small.

Figure 20:
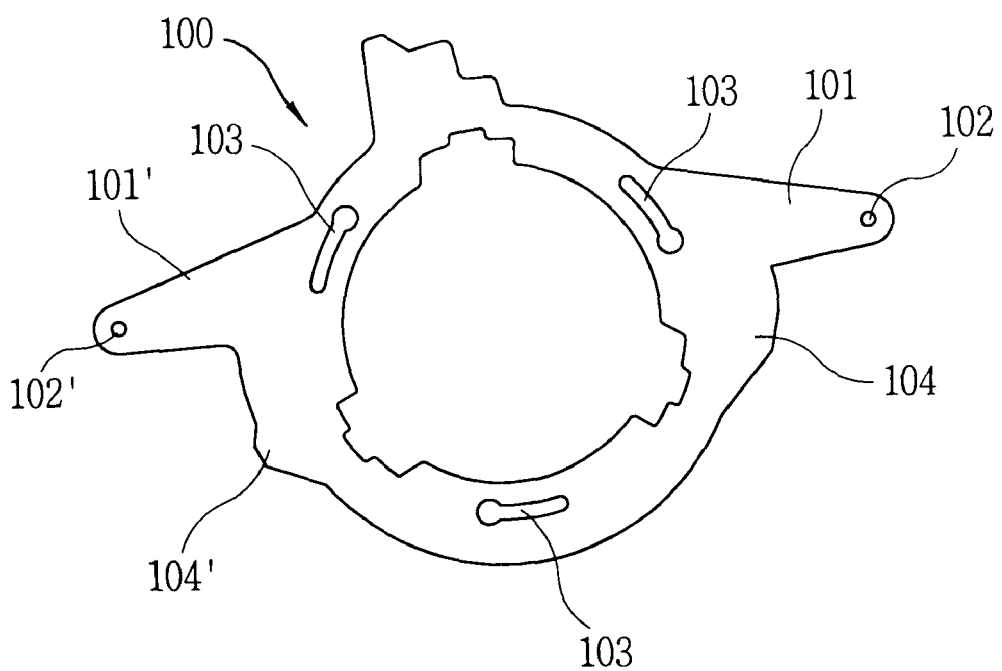
FIG. 20 is a plane view illustrating the construction of a clamping driving plate of a disk drive in accordance with the present invention.

As the disk is moved by the roller 53, the first and second holder rods 66 and 68 guide the disk D and are separated from the sides of the disk D by the engagement between cam portions 104 and 104' of the clamping driving plate 100 shown in FIG. 20, and the interference avoiding bosses 65r and 67r of the holder levers 65 and 67. If a disk D having a diameter less than 12 cm, for example an 8 cm disk, is inserted, the cam portions 104 and 104' formed on the clamping driving plate 100 as shown in FIG. 20, separate the first and second holder rods 66 and 68 from the sides of the disk D as the interference avoiding bosses 65r and 67r are engaged. First and second interlocking arms 101 and 101' are formed on opposing sides of the clamping driving plate 100 which is attached to an upper portion of the upper chassis 20, and interlocking pins 102 and 102' are provided at the end portion of the interlocking arms 101 and 101', respectively.

The first interlocking arm 101 receives driving power from the first lifting plate 90 with the interlocking pin 102 located at the driving hole 91. In addition, a driving guide slot 103 having a certain curvature is formed on the clamping driving plate 100, and the guide pin 20p installed on the upper chassis 20 is inserted into the driving guide slot 103. In this manner, the rotating movement of the clamping driving plate 100 is achieved by the driving guide slot 103 and the guide pin 20p.

Figure 21:
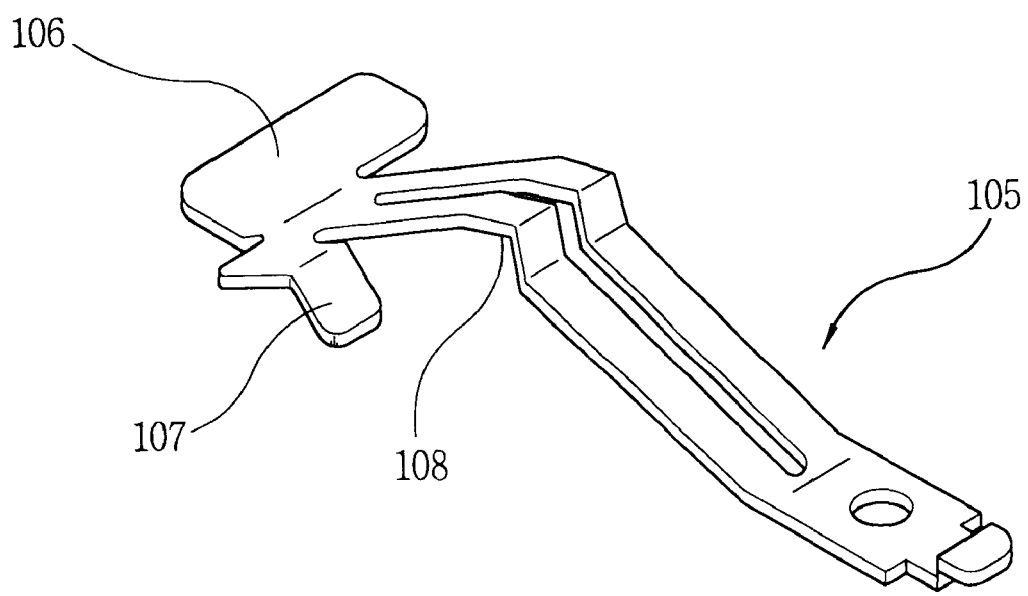
FIG. 21 is a schematic view illustrating the construction of an elastic supporting arm of a disk drive in accordance with the present invention.

Meanwhile, as illustrated in FIGS. 3 and 21, an elastic supporting arm 105 is installed on the clamping driving plate 100. One end portion of the elastic supporting arm 105 is connected to the clamping driving plate 100, a supporting plate 106 for supporting a clamping ring 110 is provided at the free end portion thereof, and a guide flap 107 for lifting the supporting plate 106 and the clamping ring 110 thereon, is formed at one side of the free end portion. The guide flap 107 varies the vertical position of the supporting plate 106 as it is moved by the rotation of the clamping driving plate 100 according to a sloping side 28 formed at the upper chassis 20. An interlocking curved portion 108 exists, between the end of the elastic supporting arm 105 connected to the clamping driving plate 100 and the supporting plate 106. As illustrated in FIG. 3, a damper 120 is installed so that it is put on the supporting plate 106 of each elastic supporting arm 105. The clamper 120 is located on the turn table on which the disk D is mounted and cooperatively operates with the clamping ring 110 so that the disk D is not randomly removed from the turn table during rotation.

Meanwhile, the second interlocking arm 101' of the clamping driving plate 100 extends opposingly from the first interlocking arm 101, and is connected with a second lifting plate 130 for controlling the lifting operation of the roller 53 and the operation of various guide rods.

Figure 19:
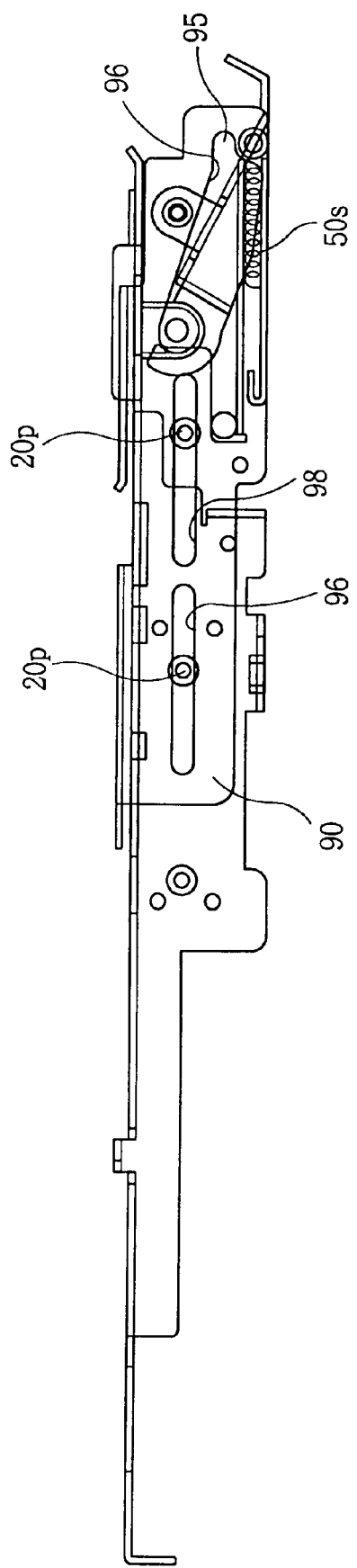
FIG. 19 is a side view illustrating the construction of the essential portion of a disk drive in accordance with the present invention.

The function of the second lifting plate 130 is similar to that of the first lifting plate 90, so the detailed description thereof will be omitted. The first lifting plate 90 and second lifting plate 130 have the same functions, which are installed at both sides of the upper chassis 20 to thus distribute the power of a spring 50s supporting the roller bracket 50 as shown in FIG. 19.

Meanwhile, the guide boss 81 of the sensor lever 80 is placed in the second guide slot 77 to thus be guided therein.

Hereinafter, vertical guide rods 141 and 141' for supporting both ends of the disk D when the center portion of the disk D has been entered into the turn table will be described. First, as illustrated in FIG. 3, vertical guide levers 140 and 140' are installed at both ends of the top surface of the upper chassis 20. At the vertical guide levers 140 and 140', vertical guide rods 141 and 141' are connected and extend to the bottom surface of the upper chassis 20 through the upper chassis 20.

In addition, the upper chassis 20 has a through hole (not shown) formed at the corresponding positions in order to allow the vertical guide rods 141 and 141' to move. To drive the vertical guide levers 140 and 140', interlocking bosses 142 and 142' are inserted into interference avoiding grooves 97 and 137 formed at the first and second lifting plates 90 and 130 as shown in FIG. 3.

One end portion of the interference avoiding grooves 97 and 137 is formed to be bent so that the vertical guide rods 141 and 141' deviate from the disk D the moment when the loading of the disk D is completed.

Hereinafter, the deviation of the roller 53 from the bottom surface of the disk D due to the movement of the first and second lifting plates 90 and 130 will be described.

The first lifting plate 90 allows the roller 53 to be lifted by lifting the roller bracket 50. This prevents the roller 53 from disturbing the rotation of the disk D during the operation of the disk D. As illustrated in FIG. 19, a cam hole 95 having a sloping cam portion 96 for driving the roller bracket 50 by supporting the roller shaft 51 is formed at one side of the first lifting plate 90. As the first lifting plate 90 is moved, the roller shaft 51 is guided toward a lower part of the sloping cam portion 96. Whereby, the roller bracket 50 is rotated round the hinge points 50h for thereby deviating the roller 53 from the bottom surface of the disk D.

The moving direction of the second lifting plate 130 is opposite to the direction of the first lifting plate 90. This is because the second interlocking arm 101' of the clamping driving plate 100 is rotated in a clockwise direction.

Hereinafter, the separation of the first and second holder rods 66 and 68, vertical guide rods 141 and 141', and sensor rods 83 for supporting the sides of the disk D from the sides of the disk D will be described.

First of all, in order to prevent disturbance to disk rotation by separating the first and second holder rods 66 and 68 from the disk D at the terminal stage of the loading operation of the disk D, cam portions 92 and 132 are formed on the first and second lifting plates 90 and 130. As the interference avoiding bosses 65r and 67r are guided to the cam portions 92 and 132, the first and second holder rods 66 and 68 are separated from the sides of the disk D.

In addition, the interference avoiding groove 97 interlocking with the vertical guide lever 140 is formed to have a bent end shape. The interference avoiding groove 97 thusly described allows the vertical guide rod 141 at the vertical guide lever 140 to be separated from the sides of the disk at the terminal stage of disk loading. The vertical guide rods 141 and 141' are separated from the sides of the disk D as the vertical guide levers 140 and 140' are guided to the bent end portions of the interference avoiding grooves 97 and 137 of the lifting plate 90 and 130.

The sensor rod 83 is separated from the disk D as the guide boss 81 of the sensor lever 80 is guided to a curved portion of the first guide slot 76 of the driving plate 70.

In addition, in order to restrict the path through which the first lifting plate 90 is moved, as illustrated in FIG. 19, there are two guide slots 96 and 98' in which guide pins 20p fixed on the upper chassis 20 are inserted.

The thusly constructed disk transferring device in accordance with the present invention can receive and transfer both 12 cm and 8 cm disks, and the disk is guided by a plurality of levers interlocking with each other. Thus, the moving operation of the disk is always precisely performed for thereby increasing the reliability of the product, and achieving the lightening, thinning, shortening, and miniaturizing of the disk drive as a on the whole.

Particularly, since the balance levers and the holder levers for guiding the disk during power connection for the clamping of the disk are not moved, the roller for transferring the disk receives less load, to thereby improve reliability and durability.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalences of such metes and bounds are therefore intended to be embraced by the appended claims.

What is claimed is:

1. A disk receiving device for a disk drive, comprising:
   a balance guide unit guiding a disk being inserted into the disk drive to prevent misalignment of the disk being inserted; and
   a holder guide unit, operatively connected with the balance guide unit and receiving the disk from the balance guide unit, to maintain alignment of the disk within the disk drive:
   wherein the balance guide unit includes:
      a first member having an interlocking hole for restricting the holder guide unit;
      an interlocking boss formed at one side of the holder guide unit positioned in the interlocking hole;
      first and second balance levers including a balance rod to guide the disk;
      first and second connecting levers connecting the balance levers;
      a second member having a guide slot to guide an interlocking pin connecting the first and second connecting levers; and
      the guide slot having a partial insertion preventing unit to prevent partial insertion of the disk.

2. The device of claim 1, wherein the interlocking hole is rectangular.

3. The device of claim 1, wherein the interlocking hole is a boomerang shape.

* * * * *